(12) United States Patent
Kurioka et al.

(10) Patent No.: US 11,074,809 B2
(45) Date of Patent: Jul. 27, 2021

(54) COMMUNICATION SYSTEM

(71) Applicant: Panasonic Intellectual Property Management Co., Ltd., Osaka (JP)

(72) Inventors: Daiki Kurioka, Osaka (JP); Mitsuru Segawa, Osaka (JP); Yoshifumi Asao, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/582,472

(22) Filed: Sep. 25, 2019

(65) Prior Publication Data

US 2020/0020225 A1 Jan. 16, 2020

Related U.S. Application Data

(63) Continuation of application No. PCT/JP2018/002747, filed on Jan. 29, 2018.

(30) Foreign Application Priority Data

Mar. 30, 2017 (JP) .............................. JP2017-066979

(51) Int. Cl.
*H04B 10/00* (2013.01)
*G08C 23/04* (2006.01)
(Continued)

(52) U.S. Cl.
CPC ........ *G08C 23/04* (2013.01); *B64D 11/00151* (2014.12); *B64D 11/00155* (2014.12);
(Continued)

(58) Field of Classification Search
CPC combination set(s) only.
See application file for complete search history.

(56) References Cited

U.S. PATENT DOCUMENTS 8,965,214 B2 * 2/2015 Weckwerth ........ H04B 10/1143
398/118
2007/0290884 A1 12/2007 Ishimoto et al.
(Continued)

FOREIGN PATENT DOCUMENTS

JP 2007-324725 12/2007
JP 2008-160627 7/2008
(Continued)

OTHER PUBLICATIONS

International Search Report dated Feb. 27, 2018 in International (PCT) Application No. PCT/JP2018/002747.

*Primary Examiner* — Agustin Bello
(74) *Attorney, Agent, or Firm* — Wenderoth, Lind & Ponack, L.L.P.

(57) ABSTRACT

A communication system includes a first terminal and a second terminal including an stow part for stowing the first terminal. The first terminal includes a first light emitter that emits infrared light, a first light receiver that receives infrared light, and a first controller. The first controller causes the first light emitter to emit light based on first specifying information upon receiving a pairing request signal via the first light receiver. The second terminal includes a second stow sensor that detects stow of the first terminal, a second light emitter that emits infrared light, a second light receiver that receives infrared light, and a second controller. The second controller causes the second light emitter to emit light based on a pairing request signal in accordance with detection of stow of the first terminal by the second stow sensor and performs control corresponding to the information including the first specifying information.

9 Claims, 12 Drawing Sheets

(51) Int. Cl.
*B64D 11/00* (2006.01)
*G08C 17/02* (2006.01)

(52) U.S. Cl.
CPC ......... *G08C 17/02* (2013.01); *G08C 2201/20* (2013.01); *G08C 2201/71* (2013.01)

(56) References Cited

U.S. PATENT DOCUMENTS

| | | | |
|---|---|---|---|
| 2008/0204606 A1 | 8/2008 | Idomukai | |
| 2008/0253772 A1 | 10/2008 | Katsuyama | |
| 2011/0018754 A1* | 1/2011 | Tojima | G08C 23/04 341/176 |
| 2011/0307726 A1 | 12/2011 | Kikuchi et al. | |
| 2014/0362517 A1* | 12/2014 | Moock | G06F 1/1632 361/679.43 |
| 2016/0009177 A1* | 1/2016 | Brooks | B65G 69/006 340/468 |
| 2017/0273597 A1* | 9/2017 | Schuelke | A61B 5/1495 |
| 2019/0011413 A1* | 1/2019 | Caussy | G01N 33/0006 |
| 2020/0020225 A1* | 1/2020 | Kurioka | H04N 21/42221 |

FOREIGN PATENT DOCUMENTS

| | | |
|---|---|---|
| JP | 2008-263308 | 10/2008 |
| JP | 2009-260934 | 11/2009 |
| JP | 2010-200203 | 9/2010 |

\* cited by examiner

COMMUNICATION SYSTEM

BACKGROUND

1. Technical Field

The present disclosure relates to a communication system that performs wireless communication by performing pairing between two devices.

2. Description of the Related Art

Patent Literature 1 (PTL 1) discloses a remote operation apparatus including an operation side first communication unit that can transmit a signal to an operation target apparatus, an operation side second communication unit that can transmit and receive a signal to and from the operation target apparatus, a pairing start means that transmits a pairing start signal for instructing to start pairing to the operation target apparatus via the operation side first communication unit, and an operation side pairing execution means that performs pairing via the operation side second communication unit. This configuration makes it possible to easily perform pairing without applying any load to a user.

Here, PTL 1 is Unexamined Japanese Patent Publication No. 2009-260934.

SUMMARY

The present disclosure provides a communication system that can easily perform pairing.

A communication system according to a first aspect of the present disclosure includes a first terminal and a second terminal that includes a stow part for stowing the first terminal, the second terminal performing wireless communication with the first terminal. The first terminal includes a first light emitter that emits infrared light, a first light receiver that receives infrared light, a first memory that stores first specifying information for specifying the first terminal, and a first controller. The first controller causes the first light emitter to emit light based on the first specifying information upon determining that a signal obtained by demodulating the infrared light received by the first light receiver includes a pairing request signal. The second terminal includes a second stow sensor that detects that the first terminal is stowed in the stow part, a second light emitter that emits infrared light, a second light receiver that receives infrared light, a second memory, and a second controller. The second controller causes the second light emitter to emit light based on the pairing request signal in accordance with detection of stow of the first terminal by the second stow sensor, causes the second memory to store the first specifying information obtained by demodulating infrared light received by the second light receiver, and upon determining that information obtained by demodulating the infrared light received by the second light receiver includes the first specifying information stored in the second memory, performs control corresponding to the information.

A communication system according to a second aspect of the present disclosure includes a first terminal, and a second terminal that wirelessly communicates with the first terminal and engages with the first terminal. The first terminal includes a first light emitter that emits infrared light, a first light receiver that receives infrared light, a first memory that stores first specifying information for specifying the first terminal, and a first controller. The first controller causes the first light emitter to emit light based on the first specifying information upon determining that a signal obtained by demodulating the infrared light received by the first light receiver includes a pairing request signal. The second terminal includes a second engagement sensor that detects engagement with the first terminal, a second light emitter that emits infrared light, a second light receiver that receives infrared light, a second memory, and a second controller. The second controller causes the second light emitter to emit light based on a pairing request signal in accordance with detection of stow of the first terminal by the second stow sensor, causes the second memory to store the first specifying information obtained by demodulating infrared light received by the second light receiver, and upon determining that information obtained by demodulating the infrared light received by the second light receiver includes the first specifying information stored in the second memory, performs control corresponding to the information.

The communication system according to the present disclosure is effective in easily performing pairing.

DETAILED DESCRIPTION

Exemplary embodiments will be described in detail below with reference to the drawings as appropriate. However, a description more detailed than necessary is sometimes omitted. For example, a detailed description of a well-known matter and a duplicated description of substantially the same configuration is omitted in some cases. This is to avoid unnecessary redundancy in the description below and to make the description easily understandable to those skilled in the art.

It is to be noted that the accompanying drawings and the description below are provided to enable those skilled in the art to fully understand the present disclosure, and are not intended to limit the claimed subject matter.

First Exemplary Embodiment

The first exemplary embodiment will be described below with reference to FIGS. 1 to 7.

[1-1 Configuration]

Figure 1:
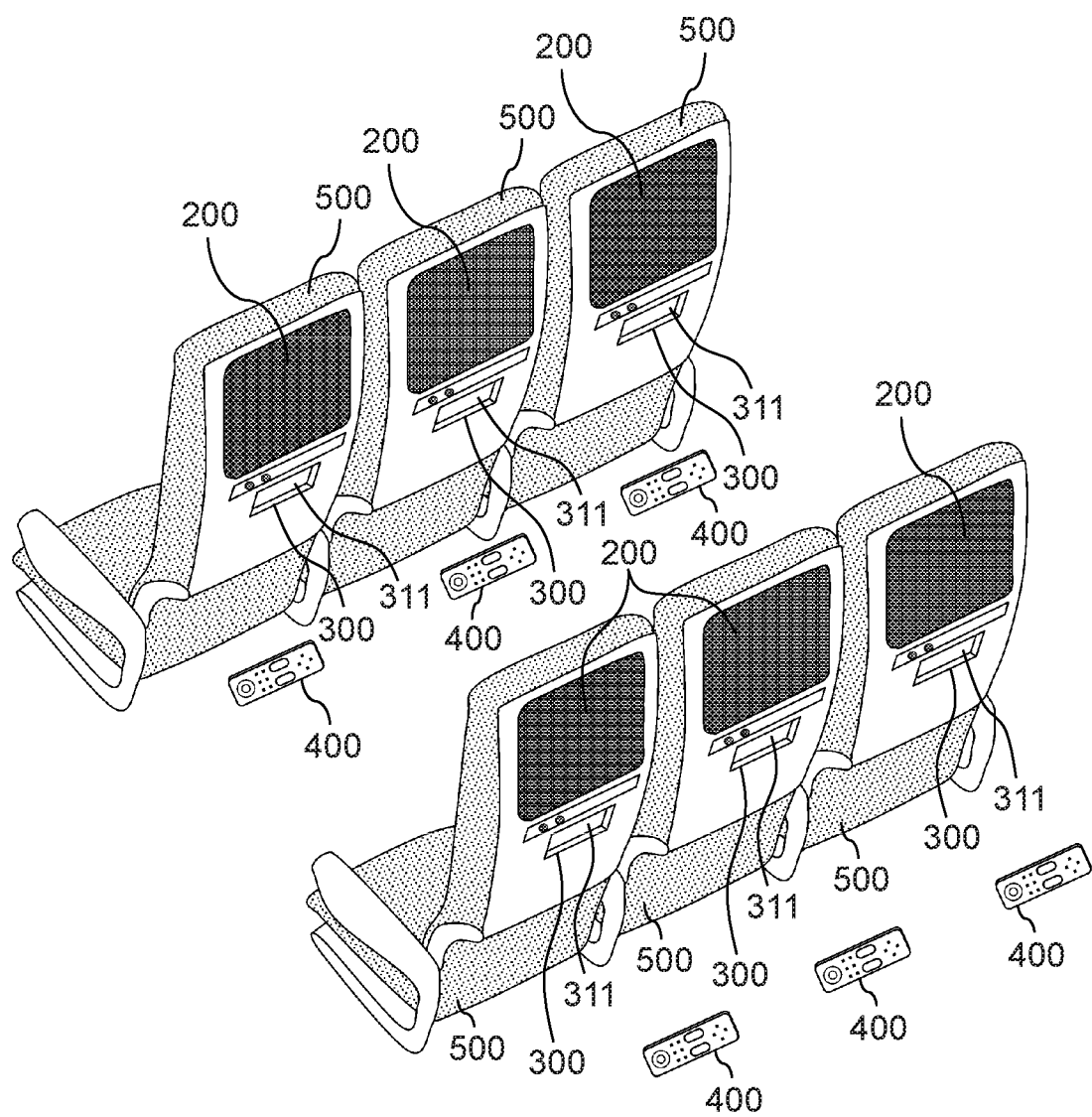
FIG. 1 is a view showing an arrangement of an in-flight monitor system provided in an aircraft according to a first exemplary embodiment.

FIG. 1 is a view showing an arrangement of in-flight monitor system 1 provided in an aircraft according to the first exemplary embodiment. In the aircraft, a plurality of seats 500 on which passengers (users) are seated are provided. In-flight monitor 200 and cradle 300 are provided at predetermined positions on a back side of a backrest of each seat 500. Each in-flight monitor 200 has the same configuration. Each cradle 300 has the same configuration. Cradle 300 includes stow part 311. Cradle 300 allows remote controller 400 to be stowed in stow part 311. Each remote controller 400 has the same configuration.

As shown in FIG. 1, in-flight monitor 200 and cradle 300 are installed at positions facing a passenger seated on seat 500 behind each seat 500 on which in-flight monitor 200 and cradle 300 are mounted so that the passenger can visually recognize in-flight monitor 200 and cradle 300. The passenger seated on seat 500 can receive various in-flight services by operating a touch panel (to be described later) on in-flight monitor 200 provided on front seat 500 or remote controller 400 or watching a video displayed on in-flight monitor 200. The passenger can operate remote controller 400 with remote controller 400 stowed in cradle 300 or taken out from cradle 300. Note that the aircraft is an example of transport equipment. The remote controller is an example of a first terminal. The cradle is an example of a second terminal.

Figure 2:
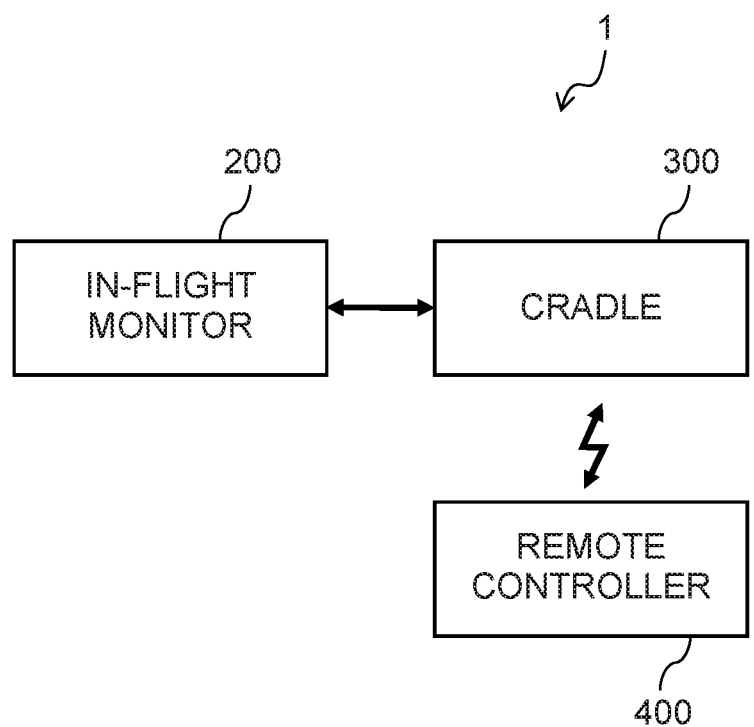
FIG. 2 is a block diagram showing a configuration of the in-flight monitor system according to the first exemplary embodiment.

FIG. 2 is a block diagram showing a configuration of in-flight monitor system 1. In-flight monitor system 1 includes in-flight monitor 200, cradle 300, and remote controller 400.

In-flight monitor 200 can, for example, play back contents delivered from a server apparatus. In-flight monitor 200 is wiredly connected to cradle 300 to perform wired communication with cradle 300. In addition, cradle 300 can wirelessly communicate with remote controller 400 via an infrared signal. That is, in-flight monitor 200 can receive operation contents from remote controller 400 via cradle 300 and perform a process corresponding to the received operation contents. The in-flight monitor system is an example of a communication system.

Figure 3:
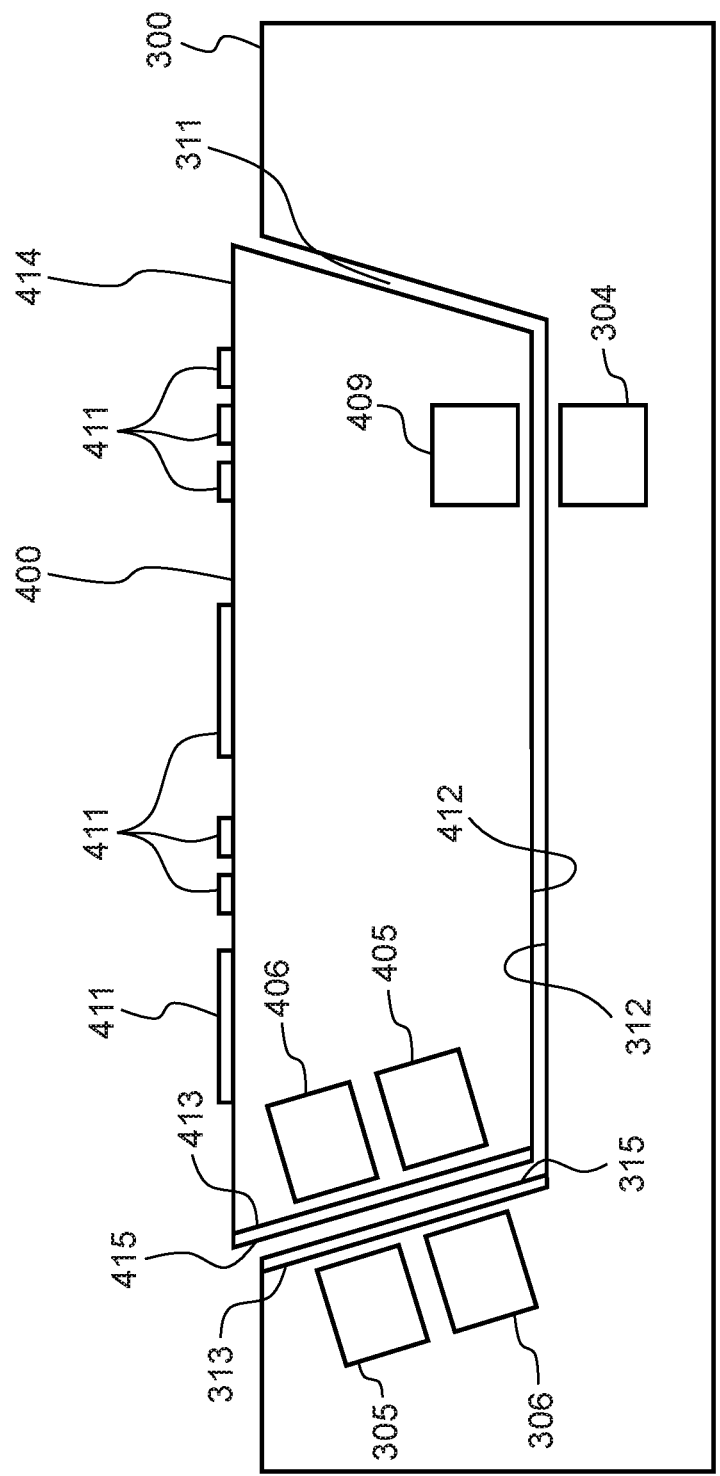
FIG. 3 is a view showing a positional relationship between respective units of a cradle and remote controller according to the first exemplary embodiment.

FIG. 3 is a view showing the positional relationship between the respective units of cradle 300 and remote controller 400. FIG. 3 shows a state in which remote controller 400 is stowed in stow part 311 of cradle 300.

Cradle 300 includes magnetic sensor 304, infrared receiver 305, and infrared transmitter 306. Cradle 300 includes stow part 311 for stowing remote controller 400 and infrared (IR) window 313. Stow part 311 has a convex shape capable of holding remote controller 400, and includes bottom surface 312 and side surface 315. Magnetic sensor 304 is disposed inside of bottom surface 312. IR window 313 is provided on side surface 315. IR window 313 is formed from a material that transmits infrared light. Infrared receiver 305 is disposed inside of IR window 313 and can externally receive an infrared signal through IR window 313. Infrared transmitter 306 is disposed inside of IR window 313 and can transmit an infrared signal to outside through IR window 313. Infrared receiver 305 is an example of a second light receiver. Infrared transmitter 306 is an example of a second light emitter.

Remote controller 400 includes infrared receiver 405, infrared transmitter 406, magnet 409, operation unit 411, and IR window 413. Magnet 409 is disposed inside of bottom surface 412 of remote controller 400. Operation unit 411 is an input interface such as a press button or touch panel and is provided on upper surface 414 of remote controller 400. IR window 413 is provided on side surface 415 of remote controller 400. IR window 413 is formed from a material that transmits infrared light. Infrared receiver 405 is disposed inside of IR window 413 and can externally receive infrared signal through IR window 413. Infrared transmitter 406 is disposed inside of IR window 413 and can transmit an infrared signal to outside through IR window 413. Infrared receiver 405 is an example of a first light receiver. Infrared transmitter 406 is an example of a first light emitter. Magnet 409 is an example of a magnetic body.

When remote controller 400 is stowed in cradle 300, bottom surface 312 of cradle 300 faces bottom surface 412 of remote controller 400. When remote controller 400 is stowed in cradle 300, magnetic sensor 304 of cradle 300 and magnet 409 of remote controller 400 face each other through bottom surface 312 of the cradle and bottom surface 412 of remote controller 400. In this case, bottom surface 312 of the cradle and bottom surface 412 of remote controller 400 are each formed from a nonmagnetic body such as a resin. Accordingly, magnetic sensor 304 can detect a magnetic field generated by magnet 409 when remote controller 400 is stowed in cradle 300.

When remote controller 400 is stowed in cradle 300, IR window 313 of cradle 300 faces IR window 413 of remote controller 400. When remote controller 400 is stowed in cradle 300, infrared receiver 305 of cradle 300 faces infrared transmitter 406 of remote controller 400 through IR window 313 of cradle 300 and IR window 413 of remote controller 400. In this case, infrared receiver 305 can receive an infrared signal transmitted from infrared transmitter 406. When remote controller 400 is stowed in cradle 300, infrared transmitter 306 of cradle 300 faces infrared receiver 405 of remote controller 400 through IR window 313 of cradle 300 and IR window 413 of remote controller 400. In this case, infrared receiver 405 can receive an infrared signal transmitted from infrared transmitter 306.

Figure 4:
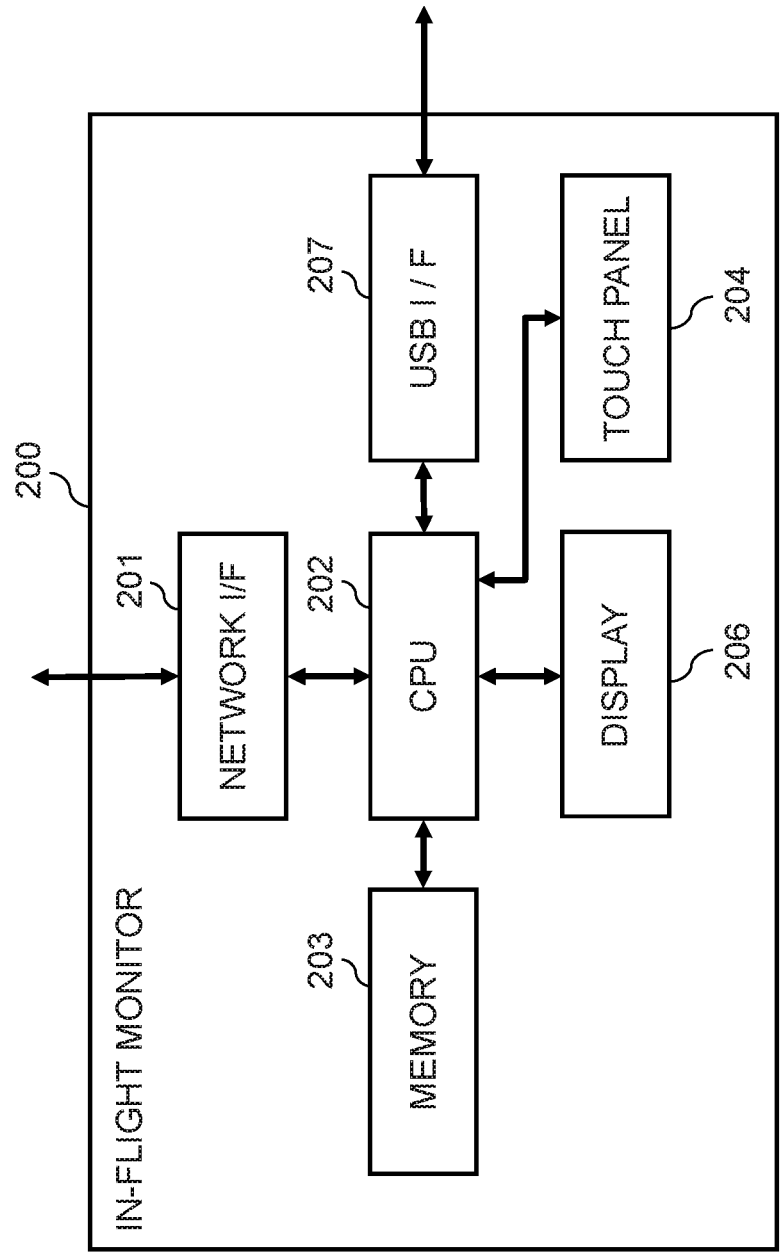
FIG. 4 is a block diagram showing an electrical configuration of an in-flight monitor according to the first exemplary embodiment.

FIG. 4 is a block diagram showing an electrical configuration of in-flight monitor 200. In-flight monitor 200 includes network interface (I/F) 201, CPU 202, memory 203, touch panel 204, display 206, and USB interface (I/F) 207. Network interface 201 is an interface that allows CPU 202 to execute communication with an external apparatus (not shown) such as a server apparatus via a network cable.

CPU 202 performs various types of computations and information processing by executing programs stored in memory 203. CPU 202 can read and write data from and to memory 203. CPU 202 communicates with a server apparatus via network interface 201. CPU 202 also communicates with cradle 300 via USB interface 207.

Memory 203 stores programs to be executed by CPU 202 and computation results obtained by CPU 202. Memory 203 is configured by a flash memory and a RAM.

Touch panel 204 is disposed on a surface of display 206. When a passenger touches display on display 206, information indicating a touch position on touch panel 204 is transmitted to CPU 202. CPU 202 performs control in accordance with this information to allow the passenger to perform intuitive operation. Display 206 displays various types of contents in accordance with instructions from CPU 202.

USB interface 207 is an interface for allowing CPU 202 to execute communication with cradle 300 via a communication cable.

Figure 5:
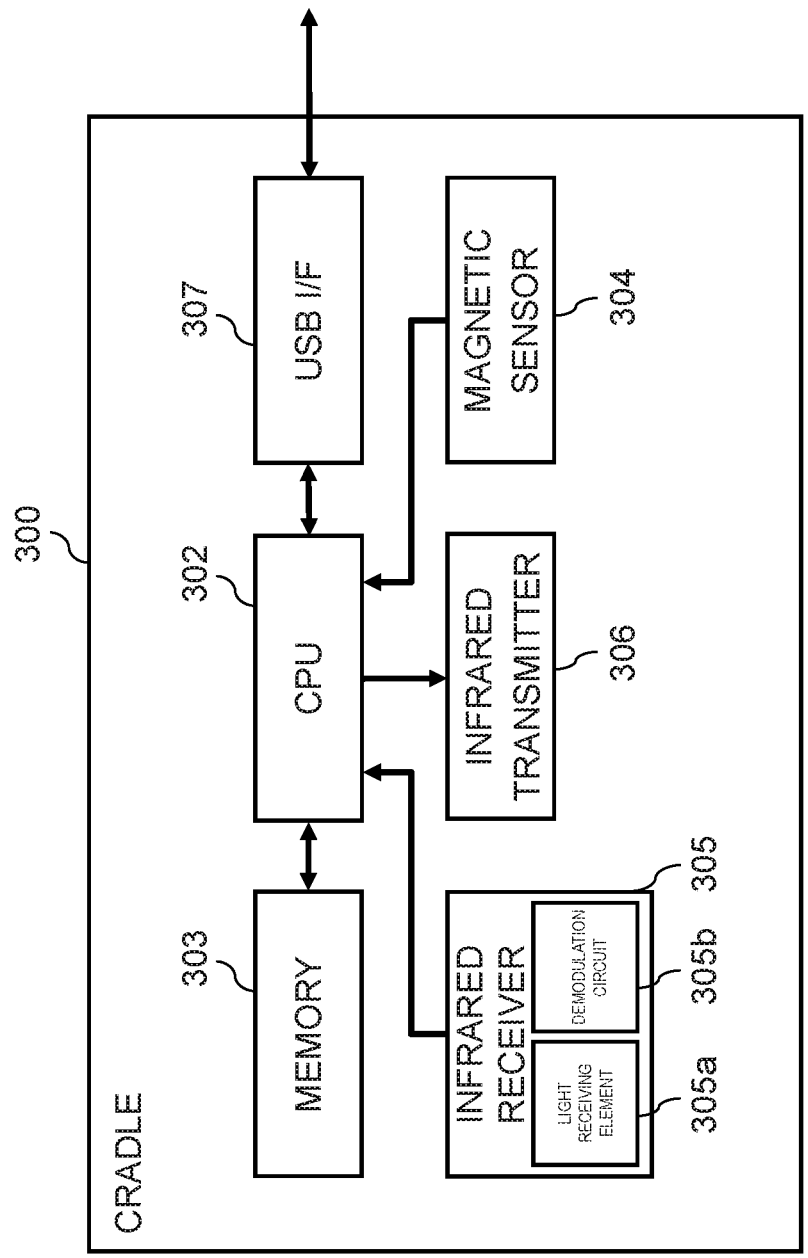
FIG. 5 is a block diagram showing an electrical configuration of the cradle according to the first exemplary embodiment.

FIG. 5 is a block diagram showing an electrical configuration of cradle 300. Cradle 300 includes CPU 302, memory 303, magnetic sensor 304, infrared receiver 305, infrared transmitter 306, and USB interface (I/F) 307.

CPU 302 performs various types of computations and information processing by executing programs stored in memory 303. CPU 302 can read and write data from and to memory 303. CPU 302 communicates with in-flight monitor 200 via USB interface 307. When transmitting a signal from infrared transmitter 306, CPU 302 causes infrared transmitter 306 to emit light based on the signal to be transmitted. More specifically, CPU 302 modulates the signal to be transmitted and causes infrared transmitter 306 to emit light in accordance with the modulated signal. CPU 302 is an example of a second controller.

Memory 303 stores programs to be executed by CPU 302, computation results obtained by CPU 302, and an ID of remote controller 400. The ID of remote controller 400 is information for specifying one remote controller 400 among a plurality of remote controllers 400. The ID of the remote controller is an example of first specifying information. Memory 303 is configured by a flash memory and a RAM. Memory 303 is an example of a second memory.

Magnetic sensor 304 detects a magnetic field at a placement position of magnetic sensor 304. When a magnetic field exceeds a specific threshold, magnetic sensor 304 transmits, to CPU 302, a detection signal indicating that the magnetic field has exceeded the threshold. Magnetic sensor 304 detects a magnetic field from magnet 409 provided in remote controller 400 and transmits a detection signal. That is, when remote controller 400 is stowed in cradle 300, magnetic sensor 304 transmits a detection signal. Magnetic sensor 304 is an example of a second stow sensor.

Infrared receiver 305 includes light receiving element 305a and demodulation circuit 305b. Light receiving element 305a receives an infrared signal from remote controller 400. Demodulation circuit 305b demodulates the infrared signal into a reception signal and transmits the reception signal to CPU 302.

Infrared transmitter 306 is an LED that emits infrared light. Infrared transmitter 306 emits an infrared signal based on a signal modulated by CPU 302.

USB interface 307 is an interface for allowing CPU 302 to communicate with in-flight monitor 200 via a communication cable.

Figure 6:
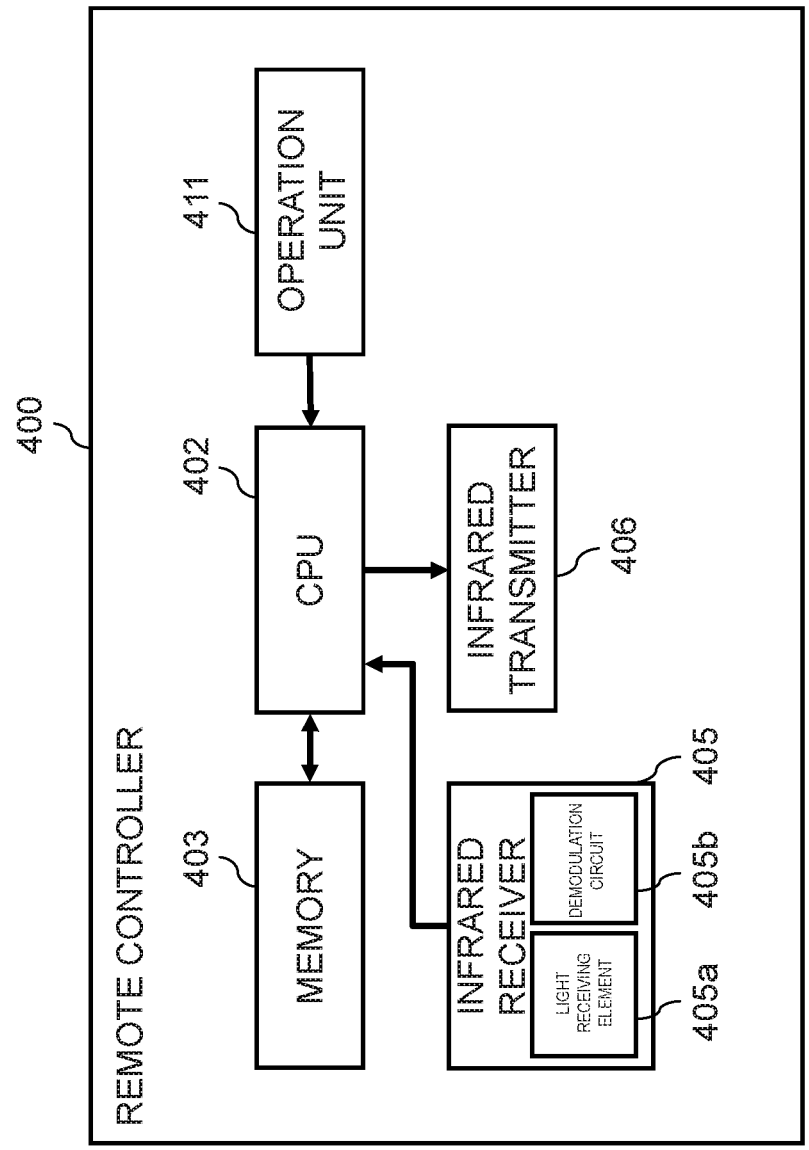
FIG. 6 is a block diagram showing an electrical configuration of the remote controller according to the first exemplary embodiment.

FIG. 6 is a block diagram showing an electrical configuration of remote controller 400. Remote controller 400 includes CPU 402, memory 403, infrared receiver 405, infrared transmitter 406, and operation unit 411.

CPU 402 performs various types of computations and information processing by executing programs stored in memory 403. CPU 402 can read and write data from and to memory 403. When transmitting a signal from infrared transmitter 406, CPU 402 causes infrared transmitter 406 to emit light based on a signal to be transmitted. More specifically, CPU 402 modulates the signal to be transmitted and causes infrared transmitter 406 to emit light in accordance with the modulated signal. CPU 402 is an example of a first controller.

Memory 403 stores programs to be executed by CPU 402, computation results obtained by CPU 402, and an ID of remote controller 400. Memory 403 is configured by a flash memory and a RAM. Memory 403 is an example of a first memory.

Infrared receiver 405 includes light receiving element 405a and demodulation circuit 405b. Light receiving element 405a receives an infrared signal from cradle 300. Demodulation circuit 405b demodulates the infrared signal into a reception signal and transmits the reception signal to CPU 402.

Infrared transmitter 406 is an LED (light emitting element) that emits infrared light. Infrared transmitter 406 emits an infrared signal based on a signal modulated by CPU 402.

Operation unit 411 is an input interface such as a press button or touch panel. When a passenger operates operation unit 411, a signal corresponding to the operation is transmitted to CPU 402.

[1-2 Operation]

Figure 7:
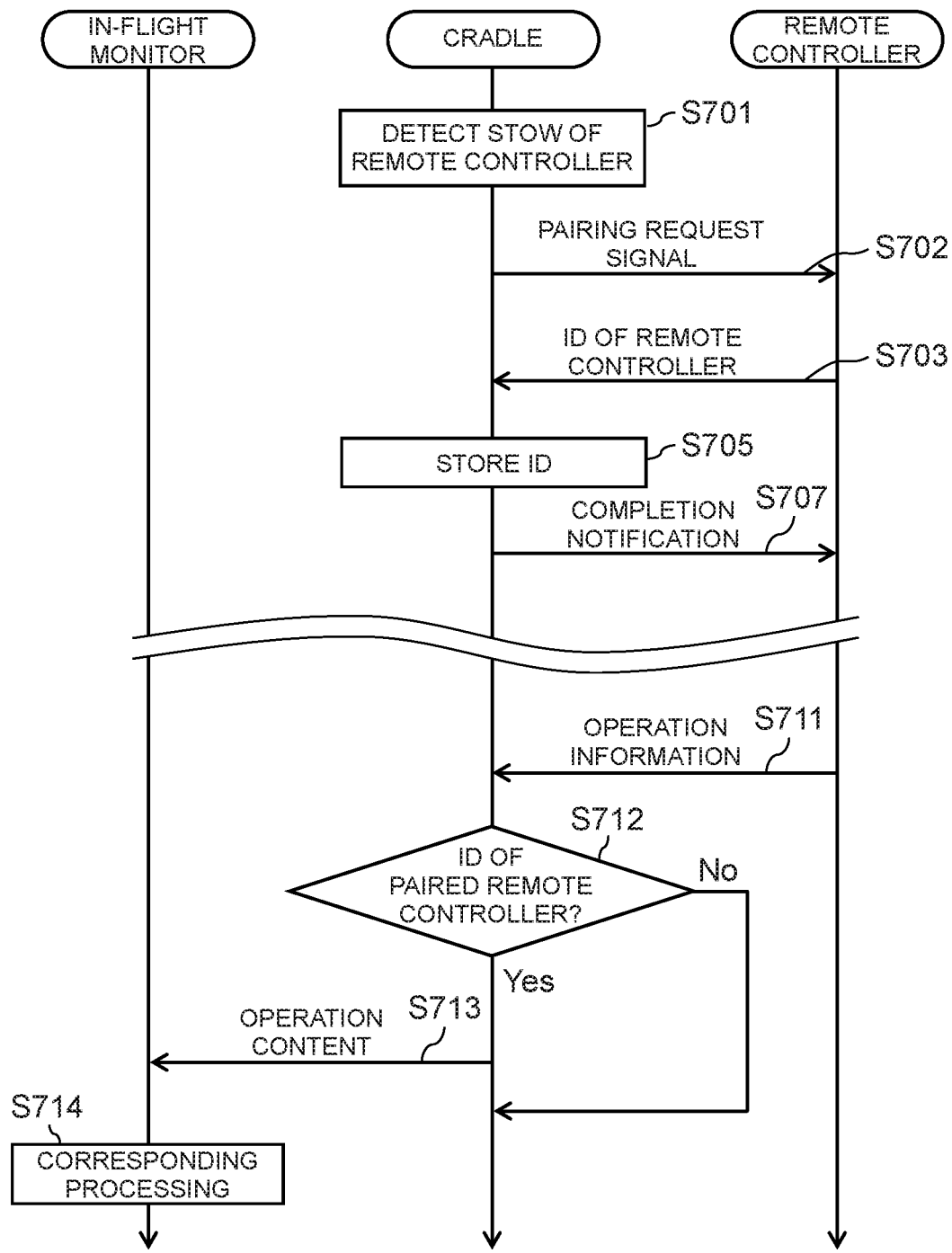
FIG. 7 is a sequence chart for describing an operation of the in-flight monitor system according to the first exemplary embodiment in and after pairing.

An operation of in-flight monitor system 1 having the above configuration will be described below. FIG. 7 is a sequence chart for describing an operation of in-flight monitor system 1 in and after pairing.

When a passenger or crew stows remote controller 400 in stow part 311 of cradle 300, cradle 300 performs pairing with stowed remote controller 400. Once pairing is performed, cradle 300 transmits a reception signal from paired remote controller 400 to in-flight monitor 200 while ignoring reception signals other than the reception signals from paired remote controller 400. An operation of in-flight monitor system 1 in this case will be described below with reference to FIG. 7.

[1-2-1] Execution of Pairing

An operation of pairing between cradle 300 and remote controller 400 will be described. CPU 302 of cradle 300 monitors stow of remote controller 400. More specifically, CPU 302 stands by until a detection signal is received from magnetic sensor 304. When remote controller 400 is stowed in the cradle, magnetic sensor 304 provided in cradle 300 comes close to magnet 409 provided in remote controller 400. Magnetic sensor 304 then detects a magnetic field from magnet 409, and outputs a detection signal. With this operation, CPU 302 detects stow of remote controller 400 (S701). Upon receiving a detection signal, CPU 302 of cradle 300 determines that remote controller 400 is stowed. CPU 302 then transmits a pairing request signal to remote controller 400 by using infrared transmitter 306 (S702). The pairing request signal is a signal including information indicating that cradle 300 requests remote controller 400 to perform a pairing operation.

CPU 402 of remote controller 400 monitors a pairing request signal from cradle 300 by using infrared receiver 405. Upon receiving a pairing request signal, CPU 402 transmits a self ID (an ID of remote controller 400) to cradle 300 by using infrared transmitter 406 (S703). CPU 302 of cradle 300 receives the ID of remote controller 400 via infrared receiver 305, and stores the ID in memory 303 (S705). Upon completing storage, cradle 300 transmits a processing completion notification to remote controller 400 by using infrared transmitter 306 (S707). With the above operation, the pairing operation is completed.

[1-2-2 Processing after Pairing]

Operations of in-flight monitor system 1 after pairing, i.e., of in-flight monitor 200, cradle 300, and remote controller 400, will be described next. In the following description, a state is assumed in which remote controller 400 is stowed in cradle 300, or a passenger has taken out remote controller 400 from cradle 300 and holds remote controller 400 so as to make IR window 413 (infrared transmitter 406) of remote controller 400 face IR window 313 (infrared receiver 305) of cradle 300, that is, remote controller 400 and cradle 300 are ready for infrared communication.

When a passenger or crew operates operation unit 411, CPU 402 of remote controller 400 transmits operation information by using infrared transmitter 406 (S711). Operation information includes the ID of remote controller 400 and an operation content (for example, information indicating that a decision button has been pressed). For example, when a passenger or crew presses a button included in operation unit 411 of remote controller 400, CPU 402 transmits operation information including the ID of remote controller 400 and an operation content indicating which button is pressed by using infrared transmitter 406.

CPU 302 of cradle 300 monitors reception of operation information from remote controller 400 by using infrared receiver 305. Upon receiving operation information via infrared receiver 305, CPU 302 compares the ID of remote controller 400 included in the operation information with the ID of remote controller 400 stored in memory 303 (S712).

If a comparison result indicates that the IDs are identical to each other (Yes in S712), cradle 300 determines that the received operation information is transmitted from paired remote controller 400. CPU 302 then performs control in accordance with this operation information. More specifically, CPU 302 transmits an operation content included in the operation information to in-flight monitor 200 by using USB interface 307 (S713). Upon receiving the operation content from cradle 300 by using USB interface 207, CPU 202 of in-flight monitor 200 executes processing corresponding to the operation content (S714). If a comparison result indicates that the IDs are different from each other (No in S712), cradle 300 determines that the received operation information is not transmitted from paired remote controller 400, and ignores the operation information.

Subsequently, repeating this operation allows in-flight monitor 200 to perform various types of operations corresponding to only operations of remote controller 400 paired with connected cradle 300.

[1-3 Effects and Others]

As described above, in this exemplary embodiment, in-flight monitor system 1 performs infrared communication between remote controller 400 and cradle 300 including stow part 311 capable of stowing remote controller 400. Remote controller 400 includes infrared transmitter 406 that emits infrared light, infrared receiver 405 that receives infrared light, memory 403 that stores the ID of remote controller 400 which is used to specify remote controller 400, and CPU 402 that causes infrared transmitter 406 to emit light based on the ID of the remote controller 400 upon determining that a signal obtained by demodulating infrared light received by infrared receiver 405 includes a pairing request signal. Cradle 300 includes magnetic sensor 304 that detects that remote controller 400 is stowed in the stow part, infrared transmitter 306 that emits infrared light, infrared receiver 305 that receives infrared light, memory 303, and CPU 302. CPU 302 causes infrared transmitter 306 to emit light based on a pairing request signal in accordance with detection of stow of remote controller 400 by magnetic sensor 304. CPU 302 then causes memory 303 to store the ID of remote controller 400 which is acquired by demodulating infrared light received by infrared receiver 305, and transmits an operation content to in-flight monitor 200 upon determining that operation information obtained by demodulating infrared light received by infrared receiver 305 includes the ID of remote controller 400 which is stored in memory 303.

This makes it possible to perform pairing between remote controller 400 and cradle 300 simply when remote controller 400 is stowed in cradle 300. Subsequently, in-flight monitor 200 connected to cradle 300 can be operated by using paired remote controller 400. That is, the in-flight monitor system according to this exemplary embodiment is effective in easily performing pairing.

Second Exemplary Embodiment

A second exemplary embodiment will be described below with reference to FIGS. 8 to 10. In-flight monitor system 2 according to the second exemplary embodiment differs from in-flight monitor system 1 according to the first exemplary embodiment in that in-flight monitor system 2 includes remote controller 420 taking two states, i.e., an active state and a sleep state, in place of remote controller 400. The same reference numerals denote the same constituent elements as those in the first exemplary embodiment, and a detailed description of the elements will be omitted.

[2-1 Configuration]

Figure 8:
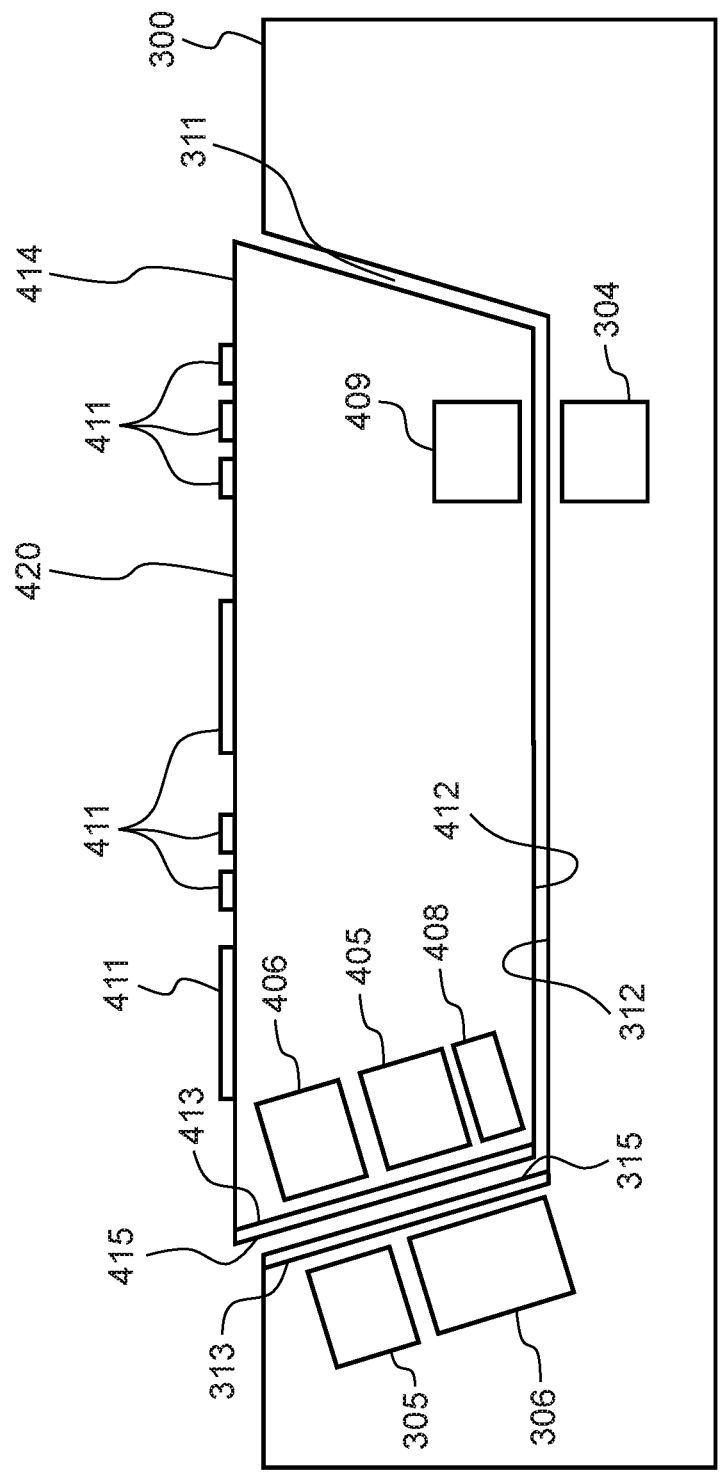
FIG. 8 is a view showing the positional relationship between respective units of a cradle and remote controller according to the second exemplary embodiment.

FIG. 8 is a view showing a positional relationship between respective units of cradle 300 and remote controller 420. Remote controller 420 includes infrared receiver 405, infrared transmitter 406, magnet 409, operation unit 411, IR transistor 408, and IR window 413.

IR transistor 408 is a phototransistor that is turned on upon receiving infrared light. IR transistor 408 is disposed inside of IR window 413 and can receive external infrared light through IR window 413.

When remote controller 420 is stowed in cradle 300, infrared transmitter 306 of cradle 300 faces infrared receiver 405 and IR transistor 408 of remote controller 420 through IR window 313 of cradle 300 and IR window 413 of remote controller 420.

Figure 9:
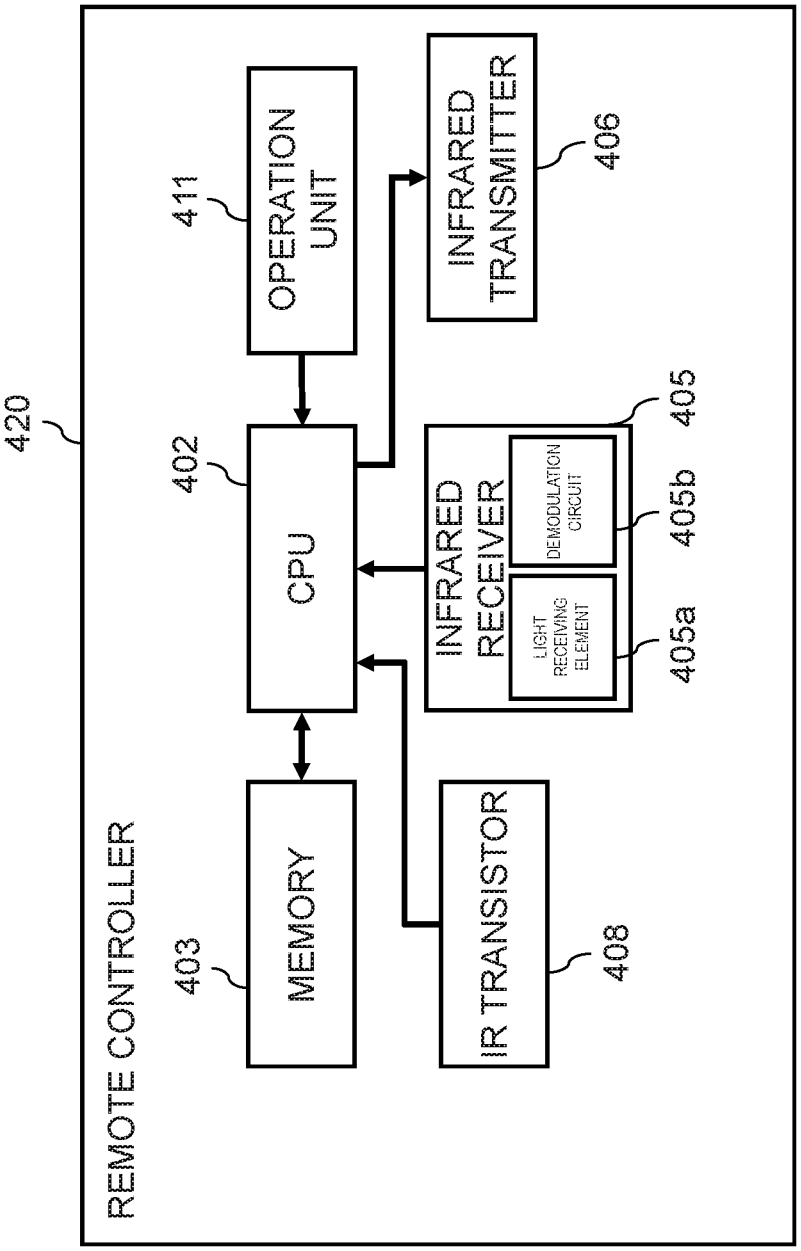
FIG. 9 is a block diagram showing an electrical configuration of the remote controller according to the second exemplary embodiment.
Figure 10:
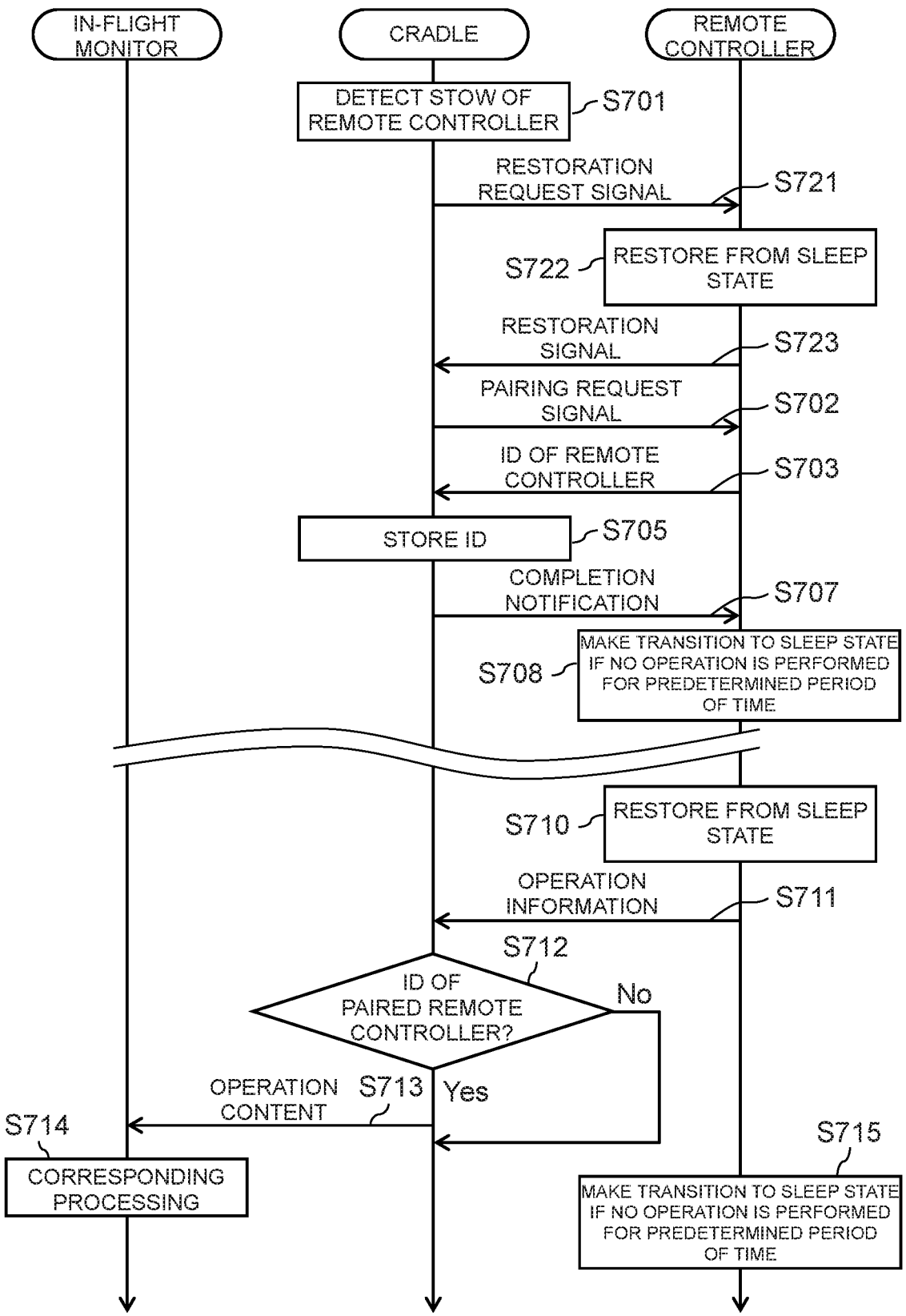
FIG. 10 is a sequence chart for describing an operation of the in-flight monitor system according to the second exemplary embodiment in and after pairing.

FIG. 9 is a block diagram showing an electrical configuration of remote controller 420. Remote controller 420 includes CPU 402, memory 403, infrared receiver 405, infrared transmitter 406, and IR transistor 408.

IR transistor 408 detects light emission from infrared transmitter 306 of cradle 300 and transmits a detection signal to CPU 402. A difference between infrared receiver 405 and IR transistor 408 will be described below. Infrared receiver 405 can receive infrared light (infrared signal) and extract a reception signal by demodulating the infrared light. Infrared receiver 405 can also demodulate signals in a higher frequency band than in IR transistor 408 but requires higher standby power than IR transistor 408. IR transistor 408 can receive only signals in a lower frequency band than in infrared receiver 405. Accordingly, IR transistor 408 is not suitable for receiving modulated infrared signal but requires lower standby power than infrared receiver 405.

[2-2 Operation]

An operation of in-flight monitor system 2 having the above configuration will be described below. FIG. 10 is a sequence chart for describing an operation of in-flight monitor system 2 in and after pairing.

An outline of an operation of in-flight monitor system 2 according to the second exemplary embodiment will be described first. When a passenger or crew stows remote controller 420 in cradle 300, cradle 300 performs pairing by causing stowed remote controller 420 to make transition from a sleep state to an active state. When pairing is completed, remote controller 420 makes transition to the sleep state.

When a button of remote controller 420 is operated, remote controller 420 makes transition from the sleep state to the active state. After the operation is completed, remote controller 420 makes transition from the active state to the sleep state.

An operation of in-flight monitor system 2 will be described below with reference to FIG. 10.

[2-2-1 Execution of Pairing]

An operation of pairing between cradle 300 and remote controller 420 will be described. Remote controller 420 is in the sleep state before pairing. The sleep state is a state in which CPU 402 is inactive, and the respective units of remote controller 420 including infrared receiver 405 are inactive with no power being supplied to the units. Even in the sleep state, IR transistor 408 is turned on upon receiving infrared light, and IR transistor 408 can transmit a detection signal to CPU 402. In addition, in the sleep state, when a passenger operates operation unit 411, operation unit 411 can transmit a signal corresponding to the operation to CPU 402. The active state is a state in which CPU 402 is active, and the respective units of remote controller 400 are active with power being supplied to the units. It is assumed that CPU 402 alone takes two states, i.e., a sleep state in which almost no power is supplied and an active state in which the respective units are active with power being supplied to the units.

When remote controller 420 is stowed in cradle 300, magnetic sensor 304 provided in cradle 300 comes close to magnet 409 provided in remote controller 420. Magnetic sensor 304 then detects a magnetic field from magnet 409, and outputs a detection signal. With this operation, CPU 302 detects stow of remote controller 420 (S701). CPU 302 of cradle 300 causes infrared transmitter 306 to emit (transmit) a restoration request signal to remote controller 420 (S721). A restoration request signal may be any type of signal as long as the signal is infrared light that can be detected by IR transistor 408. For example, a restoration request signal may be a signal that emits light with a predetermined intensity for a predetermined period of time.

IR transistor 408 receives infrared light (restoration request signal) and transmits a detection signal to CPU 402. Upon receiving this detection signal, CPU 402 makes transition from the sleep state to the active state. CPU 402 causes the respective units of remote controller 420 to start operations to cause remote controller 420 to make transition from the sleep state to the active state (S722). Remote controller 420 transmits a restoration signal indicating transition to the active state to cradle 300 by using infrared transmitter 406 (S723). Subsequently, steps S702 to S707 are the same as those in the first exemplary embodiment, and hence a description of the steps will be omitted. CPU 402 causes remote controller 420 to make transition to the sleep state if no operation is performed on remote controller 420 for a predetermined period of time after completion of pairing (S708).

[2-2-2 Processing after Pairing]

Operations of in-flight monitor 200, cradle 300, and remote controller 420 after pairing will be described. In this case, it is assumed that remote controller 420 is set in the sleep state after the completion of pairing. When a passenger or crew operates operation unit 411, a signal corresponding to the operation is transmitted to CPU 402. Upon receiving this signal, CPU 402 of remote controller 420 causes remote controller 420 to make transition from the sleep state to the active state after CPU 402 itself is set in the active state (S710). Subsequently, steps S711 to S714 are the same as those in the first exemplary embodiment, and hence a description of the steps will be omitted. If no operation is performed on remote controller 420 for a predetermined period of time after transmission of operation information in step S711, CPU 402 of remote controller 420 causes remote controller 420 to make transition to the sleep state (S715).

[2-3 Effects and Others]

As described above, in in-flight monitor system 2 according to this exemplary embodiment, remote controller 420 includes IR transistor 408 that requires lower standby power than infrared receiver 405 and receives infrared light. CPU 302 of cradle 300 causes infrared transmitter 306 to emit light based on a restoration request signal in accordance with detection of stow of remote controller 420 by magnetic sensor 304, and then causes infrared transmitter 306 to emit light based on a pairing request signal. CPU 402 of remote controller 400 in the sleep state resumes the operation upon making transition to the active state in accordance with reception of infrared light by IR transistor 408.

With this operation, even if remote controller 420 is in the sleep state, when remote controller 420 is stowed in cradle 300, remote controller 420 makes transition to the active state, thus performing pairing. That is, in-flight monitor system 2 according to this exemplary embodiment is effective in easily performing pairing. In addition, even if remote controller 420 is in the sleep state, remote controller 420 makes transition to the active state to transmit operation information when operation unit 411 is operated. In the sleep state, because the respective units including infrared receiver 405 are inactive, standby power can be reduced.

Third Exemplary Embodiment

A third exemplary embodiment will be described below with reference to FIGS. 11 and 12. In-flight monitor system 3 according to the third exemplary embodiment differs from in-flight monitor system 2 according to the second exemplary embodiment in that in-flight monitor system 3 includes, in place of remote controller 420, remote controller 430 including magnetic sensor 404 and, in place of cradle 300, cradle 330 including a magnet. The same reference numerals denote the same constituent elements as those in the second exemplary embodiment, and a detailed description of the elements will be omitted.

[3-1 Configuration]

Figure 11:
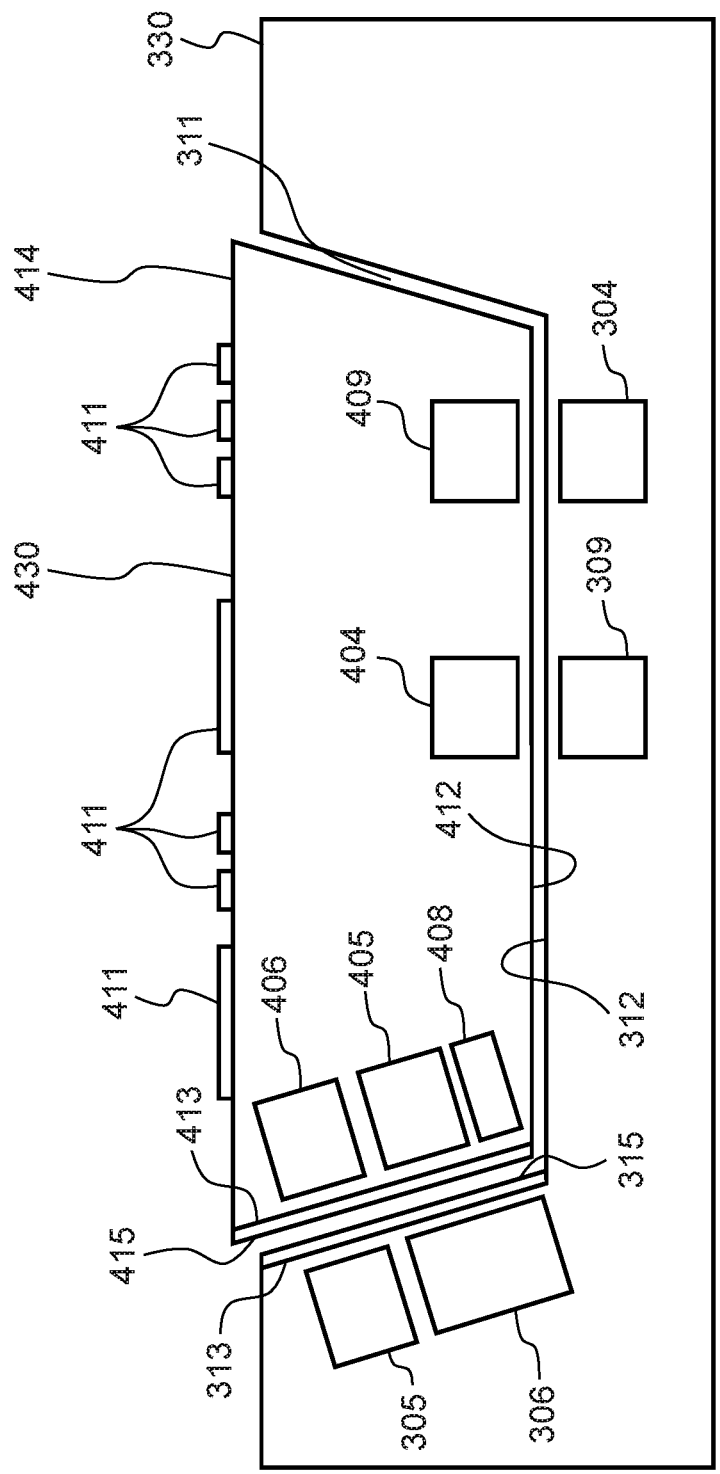
FIG. 11 is a view showing the positional relationship between respective units of a cradle and remote controller according to a third exemplary embodiment.

FIG. 11 is a view showing a positional relationship between respective units of cradle 330 and remote controller 430. Cradle 330 includes magnetic sensor 304, infrared receiver 305, infrared transmitter 306, and magnet 309. Cradle 330 includes stow part 311 for stowing remote controller 430 and IR window 313. Stow part 311 includes bottom surface 312 and side surface 315.

Remote controller 430 includes magnetic sensor 404, infrared receiver 405, infrared transmitter 406, magnet 409, IR transistor 408, and IR window 413.

Magnetic sensor 404 is disposed inside of bottom surface 412. Magnet 309 is disposed inside of bottom surface 312 of cradle 330. When remote controller 430 is stowed in cradle 330, magnet 309 of cradle 330 faces magnetic sensor 404 of remote controller 430 through bottom surface 312 of the cradle and bottom surface 412 of remote controller 430. At this time, magnetic sensor 404 can detect a magnetic field generated by magnet 309. In this case, magnetic sensor 404 is disposed at a distance at which or in a direction in which magnetic sensor 404 detects no electric field from magnet 409. Likewise, magnetic sensor 304 is disposed at a distance at which or in a direction in which magnetic sensor 304 detects no electric field from magnet 309.

Figure 12:
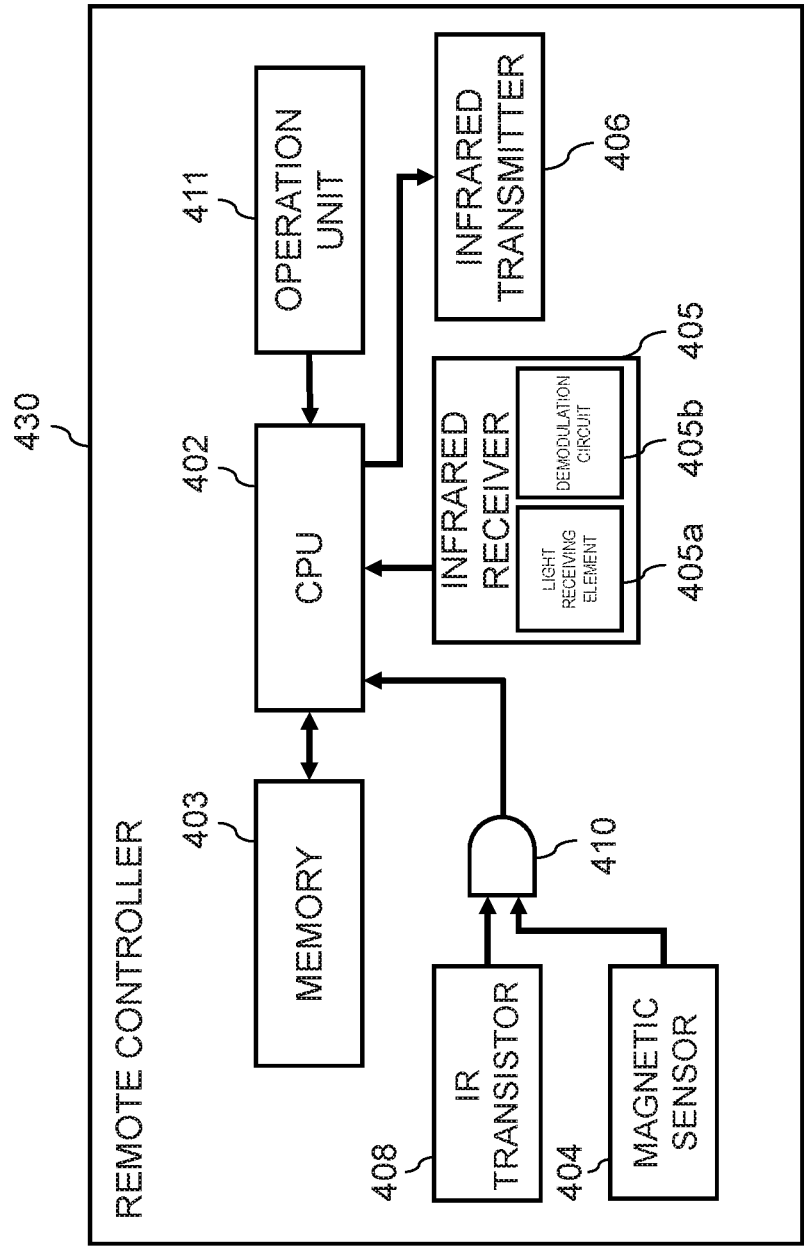
FIG. 12 is a block diagram showing an electrical configuration of the remote controller according to the third exemplary embodiment.

FIG. 12 is a block diagram showing an electrical configuration of remote controller 430. Remote controller 430 includes CPU 402, memory 403, magnetic sensor 404, infrared receiver 405, infrared transmitter 406, IR transistor 408, AND gate 410, and operation unit 411.

Magnetic sensor 404 detects a magnetic field at a placement position of magnetic sensor 404. When the magnetic field exceeds a specific threshold, magnetic sensor 404 transmits, to CPU 402, a detection signal indicating that the magnetic field has exceeded the threshold. Magnetic sensor 404 detects a magnetic field from magnet 309 provided in cradle 330 and transmits a detection signal. Magnetic sensor 404 is an example of a first stow sensor. IR transistor 408 is an example of a detection element for detecting infrared light. IR transistor 408 detects light emission from infrared transmitter 306 of cradle 330. When magnetic sensor 404 detects a magnetic field simultaneously with detection of light emission by IR transistor 408, an output from AND gate 410 changes, and a detection signal is transmitted to CPU 402.

[3-2 Operation]

An operation of in-flight monitor system 3 having the above configuration will be described below. FIG. 10 is a sequence chart for describing an operation of in-flight monitor system 3 in and after pairing. An operation of in-flight monitor system 3 will be described below with reference to FIG. 10.

[3-2-1 Execution of Pairing]

An operation of pairing between cradle 330 and remote controller 430 will be described. The third exemplary embodiment is the same as the second exemplary embodiment except for step S722, and hence only step S722 will be described below.

IR transistor 408 receives infrared light (restoration request signal) and transmits a detection signal. Magnetic sensor 404 detects a magnetic field from magnet 309 of cradle 330 and transmits a detection signal. When magnetic sensor 404 and IR transistor 408 simultaneously transmit detection signals, AND gate 410 transmits a detection signal to CPU 402. Upon detecting the detection signal from AND gate 410, CPU 402 makes transition from the sleep state to the active state. CPU 402 further causes the respective units of remote controller 430 to start operations to cause remote controller 430 to make transition from the sleep state to the active state (S722).

[3-2-2 Processing after Pairing]

Processing after pairing is the same as that in the second exemplary embodiment, and hence a description of the processing will be omitted.

[3-3 Effects and Others]

As described above, in in-flight monitor system 3 according to this exemplary embodiment, remote controller 430 includes magnetic sensor 404 for detecting stow of remote controller 430 in stow part 311. CPU 402 of remote controller 400 in the sleep state makes transition to the active state and resumes an operation in accordance with detection of stow of remote controller 430 by magnetic sensor 404 and reception of infrared light by IR transistor 408.

With this operation, even if remote controller 430 is in the sleep state, when cradle 330 is stowed, the remote controller 430 makes transition to the active state and performs pairing. That is, in-flight monitor system 3 according to this exemplary embodiment is effective in easily performing pairing. In addition, a condition that causes remote controller 430 to make transition to the active state upon being stowed in cradle 330 is both detection by magnetic sensor 404 and detection by IR transistor 408, and hence a possibility of false detection can be reduced.

Other Exemplary Embodiments

As described above, the exemplary embodiments above have been described as examples of the technique disclosed in the present application. However, the technique of the present disclosure is not limited to these exemplary embodiments, and also applicable to other exemplary embodiments that undergo modifications, replacements, additions, and omissions, for example, as appropriate. A new exemplary embodiment can also be made by combining the respective components described in the exemplary embodiments above. Thus, other exemplary embodiments are described below as examples.

Each exemplary embodiment described above has exemplified an in-flight monitor system in the aircraft. This system may be a wireless communication system that includes a cradle and a remote controller and is installed in transport equipment such as a Shinkansen bullet train or bus.

Each exemplary embodiment described above has described the configuration for causing the cradle to detect stow of the remote controller and start an operation of pairing. In-flight monitor system 1 may cause the remote controller to detect stow in the cradle and start an operation of pairing. That is, the in-flight monitor system may be configured such that configurations and operations of the magnetic sensor, the infrared transmitter, the infrared receiver, and the like of the cradle and the remote controller which are associated with pairing are inverted to cause the remote controller to detect stow by using the magnetic sensor and transmit a pairing request signal to the cradle.

Each exemplary embodiment described above has described the configuration using the ID of the remote controller as information for checking that pairing has been completed. As this information, the ID of the cradle may be used. For example, the ID of the cradle is transmitted simultaneously or after transmission of a pairing request signal from the cradle to the remote controller. The remote controller stores the ID of the cradle in the memory and then transmits a completion notification to the cradle. When the remote controller is to transmit a pairing request signal, the cradle may transmit the ID of the cradle to the remote controller in accordance with reception of the pairing request signal. The ID of the cradle is an example of second specifying information.

Each exemplary embodiment described above has described the configuration for performing pairing upon detecting stow of the remote controller (first terminal) in the stow part of the cradle (second terminal). A condition for pairing is not limited to this. The first and second terminals may be configured such that the first and second terminals can be engaged with each other by, for example, a mechanical holding mechanism or magnetic force, and the second terminal includes an engagement sensor for detecting engagement instead of the stow sensor.

Each exemplary embodiment described above has described the configuration that makes one of the cradle and the remote controller include the magnetic sensor while the other includes the magnet and detects stow by using the magnetic sensor and the magnet. A method of detecting stow by using magnetism is not limited to this. A magnetic sensor and a magnet may be arranged on one side, and a magnetic body such as an iron plate may be disposed on the other side so as to face the magnetic sensor and the magnet. With this configuration, when the remote controller is stowed in the cradle, that is, the remote controller and the cradle come close to each other, the magnet magnetizes the magnetic body facing the magnet, thereby making the magnetic sensor detect a magnetic field generated by the magnetic body. This makes it possible to detect stow.

Each exemplary embodiment described above has described the configuration using the magnetic sensor as a stow sensor. A stow sensor to be used is not limited to a magnetic sensor. It is possible to use a mechanical switch that is switched on or off in accordance with stow or an electrical switch that is switched on or off in accordance with stow.

Each exemplary embodiment described above has described the configuration in which the infrared receivers of the cradle and the remote controller each include the light receiving element and the demodulation circuit. The infrared receiver may include only the light receiving element so as to cause the CPU to perform demodulation based on an infrared signal received by the light receiving element.

Each exemplary embodiment described above has described the configuration in which the infrared transmitters of the cradle and the remote controller include the LEDs. The infrared transmitter may further include a modulation circuit so as to make the LED emit light by modulating a signal sent from the CPU.

The second and third exemplary embodiments each have described the configuration for causing the remote controller to make transition to the sleep state if no operation is performed on the remote controller in the active state for a predetermined period of time. Upon completion of a necessary operation in the active state, the remote controller may quickly make transition to the sleep state.

The second and third exemplary embodiments each have described the operation in or after pairing in the sleep state. Obviously, the remote controller can perform an operation in or after pairing in the active state. For example, upon receiving a restoration request signal in the active state, the remote controller transmits the restoration request signal to the cradle without any change. In addition, when operation unit 411 is operated in the active state, operation information corresponding to the operation is transmitted to the cradle without any change.

Each exemplary embodiment described above has described the configuration in which the in-flight monitor and the cradle are stowed in the different housings and are connected to each other via the USB I/F. The in-flight monitor and the cradle may be integrally configured so as to be stowed in an integral housing.

Each exemplary embodiment described above has described the configuration in which the cradle is provided on the back side of the backrest of each seat in an aircraft. The arrangement of each cradle is not limited to this. For example, a cradle may be provided on an upper surface or side surface of an armrest of a seat immediately behind a seat provided with an in-flight monitor.

Each exemplary embodiment described above has described, as an example of a communication system, the in-flight monitor system which includes the in-flight monitor, the cradle, and the remote controller. However, the communication system need not necessarily include any in-flight monitor. For example, a device to be connected to the cradle via the interface is not limited to the in-flight monitor and may be, for example, a projector or headphone that can express a video or sound. That is, the communication system is at least required to include the first terminal that has been described by taking a remote controller as an example and the second terminal that has been described by taking a cradle as an example.

As described above, the exemplary embodiments have been described as examples of the technique of the present disclosure. For this purpose, the accompanying drawings and the detailed description have been provided.

Accordingly, in order to exemplify the technique described above, the components described in the accompanying drawings and the detailed description may not only include components that are essential for solving the problems, but may also include components that are not essential for solving the problems. Therefore, it should not be immediately construed that these components that are not essential are essential just because these components that are not essential are described in the accompanying drawings and the detailed description.

Each exemplary embodiment described above is provided to exemplify the technique according to the present disclosure. Therefore, it is possible to make various changes, replacements, additions, omissions, and the like within the scope of the claims and equivalents thereof.

INDUSTRIAL APPLICABILITY

The communication system according to the present disclosure is effective in easily performing pairing, and can be applied to a wireless communication system in an aircraft, train, or the like.

What is claimed is:
1. A communication system comprising:
a first terminal; and
a second terminal including a stow part for stowing the first terminal, the second terminal performing wireless communication with the first terminal,
wherein the first terminal includes
a first light emitter that emits infrared light,
a first light receiver that receives infrared light,
a first memory that stores first specifying information for specifying the first terminal, and
a first controller causes the first light emitter to emit the infrared light based on having the first specifying information upon determining that a signal obtained by demodulating the infrared light received by the first light receiver includes a pairing request signal, and causes the first light emitter to emit the infrared light having operation information including the first specifying information, and
the second terminal includes
a second stow sensor that detects that the first terminal is stowed in the stow part,
a second light emitter that emits infrared light,
a second light receiver that receives infrared light,
a second memory, and
a second controller causes the second light emitter to emit the infrared light based on having the pairing request signal in accordance with detection of stow of the first terminal by the second stow sensor, causes the second memory to store the first specifying information obtained by demodulating the infrared light received by the second light receiver in response to the pairing request signal,
when the second controller determines that the operation information obtained by demodulating the infrared light transmitted from the first terminal received by the second light receiver includes the first specifying infor- mation stored in the second memory, performs control corresponding to the information, and when the second controller determines that the operation information obtained by demodulating the infrared light transmitted from the first terminal received by the second light receiver does not include the first specifying information stored in the second memory, ignores the information.

2. The communication system according to claim 1, wherein the first terminal includes a detection element, the detection element requiring lower standby power than standby power of the first light receiver, the detection element detecting infrared light, the second controller causes the second light emitter to emit light based on the pairing request signal upon causing the second light emitter to emit light based on a restoration request signal in accordance with detection of stow of the first terminal by the second stow sensor, and the first controller resumes an operation in accordance with detection of the infrared light by the detection element in a sleep state.

3. The communication system according to claim 2, wherein the first terminal includes a first stow sensor that detects that the first terminal is stowed in the stow part, and the first controller resumes an operation in accordance with detection of the stow of the first terminal by the first stow sensor and detection of the infrared light by the detection element in the sleep state.

4. The communication system according to claim 1, wherein the second terminal transmits second specifying information for specifying the second terminal to the first terminal via the second light emitter.

5. The communication system according to claim 4, wherein the second specifying information is included in the pairing request signal.

6. A communication system comprising:

a first terminal; and a second terminal that performs wireless communication with the first terminal and engages with the first terminal, wherein the first terminal includes a first light emitter that emits infrared light, a first light receiver that receives infrared light, a first memory that stores first specifying information for specifying the first terminal, and a first controller causes the first light emitter to emit the infrared light based on having the first specifying information upon determining that a signal obtained by demodulating the infrared light received by the first light receiver includes a pairing request signal, and causes the first light emitter to emit the infrared light having operation information including the first specifying information, and the second terminal includes a second engagement sensor that detects engagement with the first terminal, a second light emitter that emits infrared light, a second light receiver that receives infrared light, a second memory, and a second controller causes the second light emitter to emit the infrared light based on having the pairing request signal in accordance with detection of the engagement stow of the first terminal by the second engagement stow sensor, causes the second memory to store the first specifying information obtained by demodulating the infrared light received by the second light receiver in response to the pairing request signal, when the second controller determines that the operation information obtained by demodulating the infrared light transmitted from the first terminal received by the second light receiver includes the first specifying information stored in the second memory, performs control corresponding to the information, and when the second controller determines that the operation information obtained by demodulating the infrared light transmitted from the first terminal received by the second light receiver does not include the first specifying information stored in the second memory, ignores the information.

7. The communication system according to claim 6, wherein the second terminal transmits second specifying information for specifying the second terminal to the first terminal via the second light emitter.

8. The communication system according to claim 7, wherein the second specifying information is included in the pairing request signal.

9. The communication system according to claim 1, each time the second stow sensor detects the first terminal, the second controller causes the second light emitter to emit the infrared light based on having the pairing request signal, and causes the second memory to store the first specifying information obtained by demodulating the infrared light received by the second light receiver in response to the pairing request signal.

* * * * *